United States Patent Office 3,203,977
Patented Aug. 31, 1965

3,203,977
PROCESS FOR REACTING NITRILES AND DECA-BORANE IN THE PRESENCE OF LEWIS ACIDS
Marvin M. Fein, Westfield, Chester J. Grelecki, Denville, and George J. Donovan, Morristown, N.J., assignors to Thiokol Chemical Corporation, Bristol, Pa., a corporation of Delaware
No Drawing. Filed Oct. 21, 1960, Ser. No. 64,215
5 Claims. (Cl. 260—465.6)

This invention relates to an improved method for the reaction of nitriles and decaborane to produce solid products.

Application Serial No. 690,407, filed October 15, 1957, of Murray S. Cohen et al., describes the reaction of decaborane with a nitrile of an unsubstituted aliphatic mono- or dicarboxylic acid having from 1 to 6 carbon atoms, preferably in the presence of an inert solvent, at a temperature of 0° to 180° C. The reactant ratio is 0.01 to 14 moles of nitrile per mole of decaborane.

It has now been found that the rate of reaction of nitriles with decaborane can be increased significantly by carrying out the reaction in the presence of a catalytic amount of a Lewis acid.

Hence the process of this invention includes reacting decaborane with a nitrile of an unsubstituted aliphatic mono- or dicarboxylic acid having from 1 to 6 carbon atoms while the reactants are in admixture with a catalytic amount of a Lewis acid.

As described in application Serial No. 690,407, suitable nitriles include hydrogen cyanide, acetonitrile, propionitrile, butyronitrile, isobutyronitrile, dimethylpropionitrile, valeronitrile, acrylonitrile, 3-butenenitrile, 4-pentenenitrile, succinonitrile, maleonitrile, adiponitrile, and B,B'-oxydipropionitrile. The nitriles can be monomeric or polymeric.

The ratio of reactants can be varied widely, generally being in the range from 0.01 to 14 moles of nitrile per mole of decaborane, preferably 1 to 5:1. The amount of Lewis acid catalyst can also be varied widely, generally being in the range from 0.01 to 2 moles of Lewis acid per mole of decaborane. The reaction temperature can vary from 0° to 180° C. and the pressure can vary from 0.002 mm. of mercury to several atmospheres, although atmospheric pressure is preferred. The reaction is a substitution reaction and the degree of completeness of the reaction can be determined by the rate and quantiy of hydrogen evolved. Also the rate at which solid products form and precipitate from the solution indicates the degree of completion of the reaction. The reaction to go to completion generally requires about 3 to 30 hours depending upon the amount of catalyst, the ratio of reactants, the particular nitrile utilized, and the temperature and pressure employed.

Alhough the reaction will proceed in the absence of a solvent, best results are obtained, especially where solid reactants are employed, by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such cyclohexane and methylcyclopentane and oxygenated organic solvents such as dioxane, ethyl acetate, and diisopropyl ether. The amount of solvent can vary widely but is generally within the range of about 1 to 100 moles per mole of each reactant. When a solvent is employed, it is preferred to carry out the reaction at the reflux temperature of the solvent.

The process of the invention is illustrated in detail by the following examples.

EXAMPLE I

In a control reaction, a 300 ml. round bottom flask was equipped with a stirrer, a thermometer, and a reflux condenser with a drying tube connected to a wet test meter which monitored gas evolution. The rate of reaction was indicated by the rate of gas evolution and is presented in Table I below. A mixture of 12.2 grams (0.1 mole) of decaborane, 12.8 grams (0.1 mole) of B,B'-oxydipropionitrile and 160 milliliters of benzene was charged to the flask and heated for 17 hours at 80° C. (reflux temperature). Tan solids, 14.6 grams, were recovered and 0.057 mole of gas, identified as hydrogen, was recovered.

In a catalyzed reaction in indentical equipment, a mixture of 12.2 grams (0.1 mole) of decaborane, 12.8 grams (0.1 mole) of B,B'-oxydipropionitrile, 14.2 grams (0.13 mole) of the monoetherate of boron trifluoride and 160 milliliters of benzene was charged to the flask and heated for 32 hours at 80° C. Tan solids, 15.3 grams were recovered and 0.085 mole of gas, identified as hydrogen, was recovered. The rate of gas evolution for this reaction is also presented in Table I.

Infrared analysis of the products obtained from the control reaction and the catalyzed reaction indicated that the products were the same.

Table I

| Time (Hrs.) | Gas Evolution (Liters) Control | Gas Evolution (Liters) Catalyzed |
|---|---|---|
| 1 | 0.200 | 0.500 |
| 2 | 0.460 | 0.630 |
| 3 | 0.600 | 0.740 |
| 4.5 | 0.750 | 0.950 |
| 5 | 0.850 | 1.000 |
| 6 | 0.950 | 1.280 |
| 7.5 | | 1.400 |
| 8 | 1.120 | 1.430 |
| 9 | 1.160 | |
| 10 | 1.210 | |
| 11 | 1.220 | |
| 15 | 1.400 | |

EXAMPLE II

In this example, the same equipment was used as in Example I. A mixture of 6.1 grams (0.05 mole) of decaborane, 5.4 grams (0.05 mole) of adiponitrile, 7.1 grams (0.05 mole) of the monoetherate of boron trifluoride, and 90 milliliters of benzene was charged to the flask and heated for 120 hours at 80° C. At the end of 25 hours, 0.082 mole of gas had been liberated and a white precipitate had formed. Fifty hours of heating were necessary to achieve the same gas evolution in the absence of the boron trifluoride in an otherwise identical system.

Instead of the boron trifluoride etherate of the specific examples, other Lewis acids, including boron trifluoride, boron trichloride, boron tribromide and boron triiodide, aluminum trichloride, aluminum tribromide, ferric chloride, ferric bromide, zinc chloride, stannic chloride, antimony pentachloride, and titanium tetrachloride, can be employed.

The solid reaction products of this invention are useful in formulating solid propellant compositions for rocket power plants and other jet propelled devices as described in the above application Serial No. 690,407.

We claim:
1. A method for the preparation of solid reaction products of nitriles and decaborane which comprises reacting from 0.01 to 14 moles of a nitrile selected from the group consisting of acetonitrile, propionitrile, butyronitrile, isobutyronitrile, dimethylpropionitrile, valeronitrile, acrylonitrile, 3-butenenitrile, 4-pentenenitrile, succinonitrile, maleonitrile, adiponitrile and B,B'-oxydipro- pionitrile per mole of decaborane while the rectants are in admixture with a catalytic amount of a Lewis acid selected from the group consisting of boron trifluoride, boron trichloride, boron tribromide, boron triiodide, aluminum trichloride, aluminum tribromide, ferric chloride, ferric bromide, zinc chloride, stannic chloride, antimony pentachloride, titanium tetrachloride and boron trifluoride etherate.

2. A method for the preparation of solid reaction products of nitriles and decaborane which comprises reacting from 0.01 to 14 moles of a nitrile per mole of decaborane at a temperature of 0° to 180° C. in the presence of a solvent inert with respect to the reactants while the reactants are in admixture with from 0.01 to 2 moles of a Lewis acid selected from the group consisting of boron trifluoride, boron trichloride, boron tribromide, boron triiodide, aluminum trichloride, aluminum tribromide, ferric chloride, ferric bromide, zinc chloride, stannic chloride, antimony pentachloride, titanium tetrachloride and boron trifluoride etherate, per mole of decaborane, the nitrile being a nitrile selected from the group consisting of acetonitrile, propionitrile, butyronitrile, isobutyronitrile, dimethylpropionitrile, valeronitrile, acrylonitrile, 3-butenenitrile, 4-pentenenitrile, succinonitrile, maleonitrile, adiponitrile and B,B'-oxydipropionitrile.

3. The method of claim 1 wherein the nitrile is B,B'-oxydipropionitrile.

4. The method of claim 2 wherein the boron halide is boron trifluoride.

5. The method of claim 2 wherein the nitrile is B,B'-oxydipropionitrile, wherein the solvent is benzene, and wherein the boron halide is boron trifluoride.

No references cited.

CHARLES B. PARKER, *Primary Examiner.*
LEON D. ROSDOL, *Examiner.*